June 24, 1930. W. C. URTON 1,768,275
AIR PRESSURE GAUGE
Filed Jan. 31, 1928
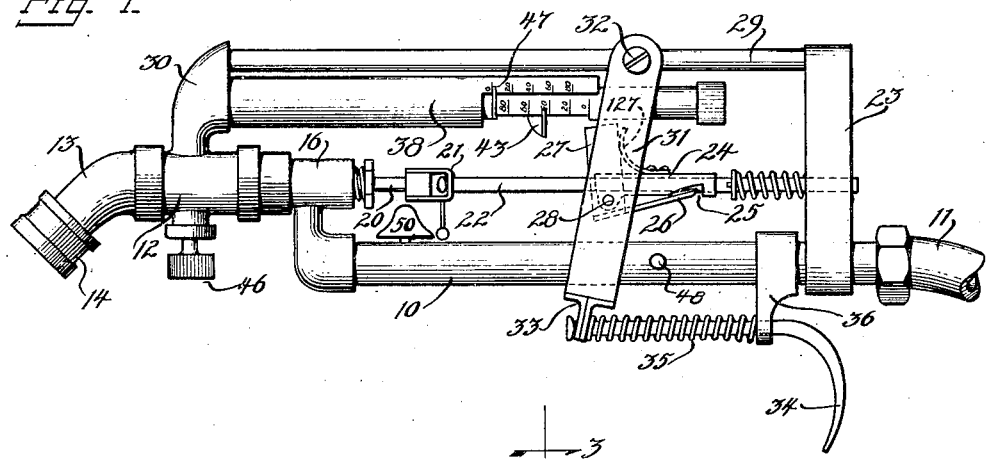
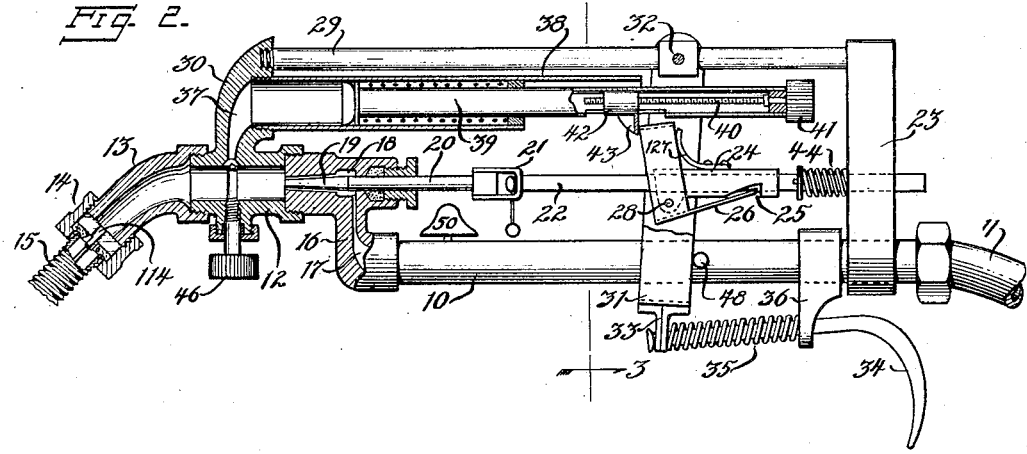
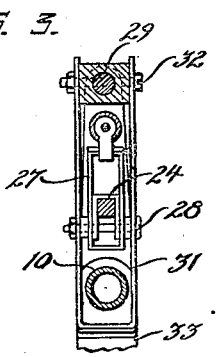
WITNESSES
INVENTOR
William Cooley Urton
BY
ATTORNEY Patented June 24, 1930

1,768,275

UNITED STATES PATENT OFFICE

WILLIAM COOLEY URTON, OF ROSWELL, NEW MEXICO

AIR-PRESSURE GAUGE

Application filed January 31, 1928. Serial No. 250,855.

My invention relates to a gauge, and particularly to a gauge for use in connection with an attachment employed for inflating tires.

The general object of my invention is to provide a gauge for the indicated purpose of simple construction and effective in operation, arranged to permit of gauging and indicating various pressures.

The nature of my invention and its distinguishing features and advantages will more clearly appear as the description proceeds.

Reference is to be had to the accompanying drawings forming part of this specification, it being understood that the drawings are merely illustrative of examples of the invention;

Figure 1 is a side elevation of an air pressure gauge embodying my invention;

Figure 2 is a view partly in section and partly in side elevation given to show the interior construction of certain portions of the gauge;

Figure 3 is a transverse section in line 3—3 of Figure 2.

In the illustrated example of my invention the numeral 10 indicates an air tube adapted to be connected at its rear end with an air line 11, and connected at its front end with a fitting 12 secured to which fitting is a nozzle 13 having a collar 14 adapted to receive a tire valve 15. The above description refers to the form shown in Figures 1 and 2.

Pipe 10 connects to the fitting 12 through the medium of an elbow 16 having an air passage 17 leading from said air pipe 10 to a valve chamber 18 communicating with the interior of the fitting 12. Said valve chamber 18 accommodates valve 19 on valve stem 20. Said stem 20 connects by yoke 21 with the front end of a valve operating rod 22 extending through a transverse frame 23 through which the air pipe 10 extends. On the rod 22 is a sleeve 24 having a notch 25 receiving the end of a latch 26 on a latch element 27 pivoted as at 28 to the sleeve 24.

A tie rod 29 is secured at its front end to a tubular arm 30 on fitting 12, and secured at its rear end to the transverse frame element 23. A yoke 31 is pivoted as at 32 to the tie rod 29 and has spaced sides extending on opposite sides of the device beyond the air pipe 10.

At the free end of the yoke 31 is a suitable bracket 33 to which is secured one end of a trigger 34, about which is coiled a spring 35 abutting at one end against bracket 33 and abutting at its opposite end against a bracket 36 on air pipe 10.

A pull on the trigger 34 will swing the yoke 31 on its pivot 32 thereby making sleeve 24 and rod 22 move longitudinally by latch 26 engaging in notch 25 in rod 22 which is square in cross section, and thus open the valve 19 and permit air to flow from air line 11, through air pipe 10 and passage 17 to the fitting 12.

A shut-off valve 46 on fitting 12 controls an air passage from said fitting through a tubular arm 30 to a gauge tube 38 having graduations thereon. Operating in gauge tube 38 is a spring pressed plunger 39 normally tending to move toward the passage 37. In the tube 39 is a screw 40 having a milled head 41, or equivalent, for turning the screw, and on said screw is a nut or traveler 42 having a trip member 43 adapted to engage and trip the latch element 27. The trip 43 is adapted by the turning of the screw 40 to vary the traveling movement of the nut or traveler 42 so as to set the same to function at various pressures indicated by the graduations on the plunger 39. Thus, when air is admitted from air tube 10 through passage 17, fitting 12, and air passage 37 to the gauge tube 38, the air being under pressure from the air line 11 will cause the plunger 39 to be moved in the cylinder or gauge tube 38. The movement of the plunger 39 carries with it nut 42 and trip 43 so that the said trip will engage the latch element 27 for tripping the latch 26 automatically at a predetermined pressure for which the device is set.

The spring 44 tends to normally maintain the valve 19 closed by restoring the rod 22 and valve stem 20 after a movement thereof by the swinging of the yoke 31.

Thus, when the valve 19 is opened by the swinging of the yoke 31 the latch 26 on sleeve 24 will be engaged automatically by the tension spring 127 engaging element 27 and serving to hold the valve 19 open. The valve 19 will remain open until the pressure for which the trip 43 is set is reached, and when the trip reaches the indicated pressure the element 27 will be tripped and by releasing the latch 26 and freeing the rod 22, the valve 19 will be closed under pressure of the spring 44.

The numeral 46 indicates a shut-off valve provided on fitting 12 and acting to shut off communication between fitting 12 and air passage 37 leading to gauge tube 38 when the gauge tube is not desired to be used. With the closing of the valve 46 the opening of the valve 19 will cause the air from pipe 10 to pass to nozzle 13 and collar 14 and to tire valve 15 of the tube.

It is to be observed that the passage 17 as it approaches the valve chamber 18 is of restricted capacity and is smaller than the passage 114 leading from collar 14 to the tire valve (15). The idea is to have the passage 17 act in a predetermined manner to reduce the pressure to a given extent after the manner of a pressure reducing valve, so that the pressure in the fitting 12 determines the pressure at the passage 114 and in the gauge tube 38 as well, so that the same pressures will be indicated by the pointer 47 along the graduations shown on the gauge tube 38 and at the passage 114 communicating with the tire valve and subject to tire pressure.

The numeral 48 indicates a stop which may be of any approved form provided on the air tube 10 to limit the movement of the yoke 31 under the action of the spring 35 whereby to insure that the element 27 will always be in the same position for tripping when trigger 34 is pulled, thereby insuring the tripping at the same place.

Reverting to collar 14 and the assemblage disposed within said collar, I would mention that the assemblage is exceedingly simple and does away with all working parts that might be liable to get out of order.

The numeral 50 indicates a bell to be engaged by any suitable member appurtenant to the yoke 21 or its equivalent as the valve 19 approaches the closed position.

I would state furthermore that while the illustrated examples constitute practical embodiments of my invention, I do not limit myself strictly to the exact details herein illustrated, since, manifestly, the same can be considerably varied without departure from the spirit of the invention as defined in the appended claims.

I claim:

1. In a gauge device of the class described, a supporting member, an air pipe carried by the member and adapted to be connected with an air supply, a fitting to which the air pipe is connected, a spring pressed stem mounted for reciprocation longitudinally of the supporting member, a valve carried by the stem for controlling communication between the air pipe and fitting, a lever swingably mounted in the supporting member, a latch pivoted on the lever, means on the stem engageable with the latch for connecting the latch with the stem so that when the lever is oscillated the stem will be reciprocated to place the valve in open position, and means controlled by the air pressure in the fitting when the valve is opened to cause the latch to be released from means on the stem to permit release of the stem and closing of the valve.

2. In a gauge device of the class described, a supporting member, an air pipe carried by the member and adapted to be connected with an air supply, a fitting to which the air pipe is connected, a spring pressed stem mounted for reciprocation longitudinally of the supporting member, a valve carried by the stem for controlling communication between the air pipe and fitting, a lever swingably mounted in the supporting member, a latch pivoted on the lever and bodily shiftable by the lever longitudinally of the supporting member, means on the stem engageable with the latch for connecting the latch with the stem so that when the lever is oscillated the stem will be reciprocated to place the valve in open position, and means controlled by the air pressure in the fitting when the valve is opened to cause the latch to be released from means on the stem to permit release of the stem and closing of the valve.

3. In a gauge device of the class described, a supporting member, an air pipe carried by the member and adapted to be connected with an air supply, a fitting to which the air pipe is connected, a spring pressed stem mounted for reciprocation longitudinally of the supporting member, a valve carried by the stem for controlling communication between the air pipe and fitting, a lever swingably mounted in the supporting member, a latch pivoted on the lever, means on the stem engageable with the latch for connecting the latch with the stem so that when the lever is oscillated the stem will be reciprocated to place the valve in open position, a plunger operated by the air pressure in the fitting, means on the plunger and engageable with latch for rocking said latch and releasing the same from the stem at a predetermined pressure of air in the fitting.

4. In a gauge device of the class described, a supporting member, an air pipe carried by the member and adapted to be connected with an air supply, a fitting to which the air pipe is connected, a spring pressed stem mounted for reciprocation longitudinally of the supporting member, a valve carried by the stem for controlling communication between the air pipe and fitting, a lever swingably mounted in the supporting member, a latch pivoted on the lever, means on the stem engageable with the latch for connecting the latch with the stem so that when the lever is oscillated the stem will be reciprocated to place the valve in open position, means controlled by the air pressure in the fitting when the valve is opened to cause the latch to be released from means on the stem to permit release of the stem and closing of the valve, a sleeve slidably mounted on the stem and provided with a slot adapted to be alined with the latch engaging means on the stem to permit the latch to enter the slot and engage said means, the sleeve, lever, and latch being movable independently of the stem when the latch is out of contact with the latch-engaging means.

Signed at Roswell, in the county of Chaves and State of New Mexico, this 23rd day of January, A. D. 1928.

WILLIAM COOLEY URTON.